United States Patent [19]

Pfeffer, III et al.

[11] Patent Number: 4,462,794

[45] Date of Patent: Jul. 31, 1984

[54] METHOD OF OPERATING A ROTARY CALCINER RETROFITTED TO COAL-FIRING

[75] Inventors: Henry A. Pfeffer, III, Mercerville; Judith N. Fradkin, Princeton, both of N.J.

[73] Assignee: Intermountain Research & Development, Green River, Wyo.

[21] Appl. No.: 441,016

[22] Filed: Nov. 12, 1982

[51] Int. Cl.³ ............................ F27B 15/00; F27B 7/36
[52] U.S. Cl. ..................................... 432/14; 432/105; 110/260; 110/347; 110/229
[58] Field of Search ............... 110/229, 233, 260, 262, 110/347; 432/105, 106, 14

[56] References Cited

U.S. PATENT DOCUMENTS

| | | | |
|---|---|---|---|
| 430,929 | 6/1890 | Duryee | 110/260 X |
| 821,355 | 5/1906 | Gerlach | 432/64 |
| 939,049 | 11/1909 | Matcham | 432/106 |
| 1,088,559 | 2/1914 | Farquhar | 126/116 |
| 1,378,592 | 5/1921 | McLaughlin | 432/94 |
| 1,505,918 | 8/1924 | Croll | 432/4 |
| 1,508,555 | 9/1924 | Hults | 422/209 |
| 1,790,870 | 7/1927 | Mantle | 110/204 |
| 1,953,090 | 4/1934 | Vroom | 110/262 |
| 3,131,996 | 5/1964 | Seglin et al. | 432/206 |
| 3,395,906 | 8/1968 | Wiseman et al. | 432/67 |
| 3,813,210 | 5/1974 | Miskolczy et al. | 432/15 |
| 3,838,189 | 9/1974 | Sopchak et al. | 423/184 |
| 3,949,684 | 4/1976 | Copeland | 110/345 |
| 4,032,287 | 6/1977 | Blum et al. | 431/175 |
| 4,190,005 | 2/1980 | Cookson | 110/347 |
| 4,377,978 | 3/1983 | Eusner | 432/105 X |

FOREIGN PATENT DOCUMENTS 42867 4/1979 Japan .............................. 110/346

Primary Examiner—Henry C. Yuen
Attorney, Agent, or Firm—Christopher Egolf

[57] ABSTRACT

Method of operating a rotary calciner retrofitted from oil- or natural gas-firing to coal-firing, in which coal is burned in a coal furnace and the coal combustion gases are then heated further in a booster burner utilizing oil or natural gas, to raise the combustion gas temperature to permit processing of calcine at up to a design capacity rate.

3 Claims, 1 Drawing Figure

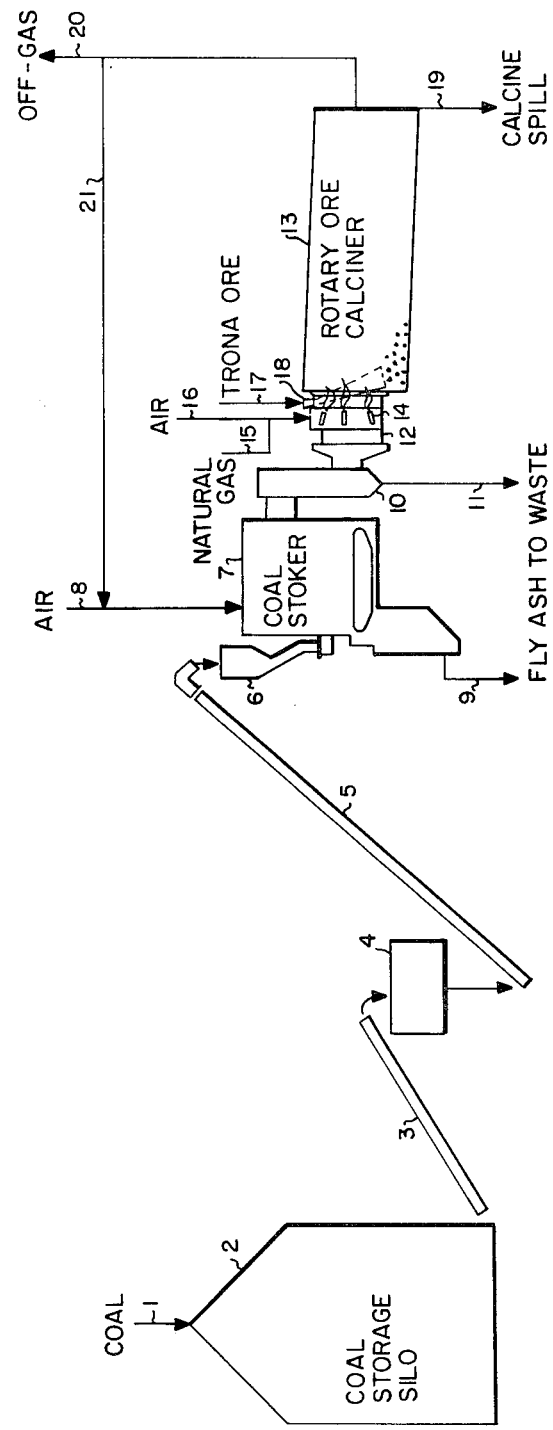

METHOD OF OPERATING A ROTARY CALCINER RETROFITTED TO COAL-FIRING

BACKGROUND OF THE INVENTION

The present invention pertains to high temperature, rotary calciners retrofitted from natural gas- or oil-firing to the use of coal as fuel and to their method of operation.

Rotary calciners, which are also called rotary kilns or rotary furnaces, are employed for calcining or roasting a variety of solid materials at high temperatures. U.S. Pat. Nos. 3,131,996, 3,838,189 and 3,395,906 disclose the use of rotary calciners in soda ash processes for converting trona ore (crude sodium sesquicarbonate) to a crude anhydrous sodium carbonate. U.S. Pat. No. 3,813,210 describes the use of rotary kilns for producing cement clinker from limestone and clay. Rotary kilns are also widely used for calcining limestone (calcium carbonate) to lime (calcium oxide).

Clean-burning fuels like natural gas or fuel oil are generally used to fire such high temperature calciners or kilns, particularly since these fuels readily provide the high temperature combustion off-gas desired for calcination.

Because of limited availability and rising costs of natural gas and fuel oil, it is becoming increasingly desirable to convert rotary calciners fired by these fuels to coal, a cheaper, more plentiful alternative fuel.

Conversion, or retrofit, of a rotary calciner to coal normally results in a significant reduction in the solids-processing capacity of the kiln, since the coal combustion gas temperature must be held below the softening temperature of the coal ash. This maximum allowable gas temperature for coal combustion is usually much less than the combustion gas temperatures achieved with natural gas or oil as a fuel. Consequently, a significantly larger volume of coal combustion gas must be employed to supply the calcination heat input required for a given amount of solid material, assuming that the low gas temperatures provide sufficient driving force to effect calcination.

One way in which solids-processing capacity in a coal-retrofitted calciner can be maintained at the original design level is to provide additional heat by preheating the solid material before it is introduced to the calciner. This is often an unsatisfactory solution since the preheating apparatus entails a substantial capital investment.

Another approach to this dilemma is to modify the interior of the calciner to increase the residence time of the solids, despite higher gas flows. This solution also can involve major, costly modifications to the calciner and is often not a practical answer because of the high gas flows, i.e., gas velocities, required to supply the needed heat input. Furthermore, despite the presence of sufficient heat input, the lower temperature of the coal combustion gas sometimes precludes proper calcination of the solid being processed.

The present invention provides a relatively simple solution for achieving a coal-retrofit of a natural gas- or oil-fired calciner, without the drawbacks of low combustion gas temperature or high retrofit equipment costs.

SUMMARY OF THE INVENTION

In accordance with the present invention, a rotary calciner retrofitted from oil or natural gas-firing to coal-firing is operated by the method which comprises (a) burning coal with air in a coal furnace to yield combustion gases whose temperature is below the softening point of the coal ash;

(b) directing the coal combustion gases into proximity to a natural gas or oil booster burner;

(c) burning sufficient natural gas or oil in the booster burner, in the presence of the coal combustion gases, to raise the temperature of the resultant combined combustion gases to at least 2300° F. (1260° C.);

(d) limiting the relative amount of natural gas or oil burned with respect to the coal such that at least half of the heat value in the resultant combined combustion gases is supplied from the coal combustion; and (e) introducing the resultant combined combustion gases into a rotary calciner, whereby up to a design capacity rate of material is processed by contact with such hot combustion gases.

The coal is preferably burned with an amount of air in a coal furnace that yields coal combustion gases at a temperature of from 1500°–1900° F. (815°–1040° C.).

The amount of natural gas or oil employed in the booster burner is preferably controlled so as to raise the temperature of the resultant combined combustion gases, leaving the region of the booster burner, to at least 2500° F. (1370° C.), most preferably at least 2750° F. (1510° C.). These preferred hot combustion gas temperatures are particularly suited for operation of rotary calciners employed to calcine trona ore.

The present invention also embraces a rotary calciner retrofitted from oil- or natural gas-firing to coal-firing, which apparatus comprises (a) an inclined, rotatable calciner, into whose upper end is introduced a solid material to be calcined;

(b) a coal furnace, wherein coal is burned with air to yield combustion gases whose temperature is maintained below the fusion point of the coal ash;

(c) a throatpiece, connecting the calciner with the coal furnace and providing a conduit for directing the coal combustion gases into the calciner; and (d) a booster burner, located in the throatpiece, in which sufficient natural gas or oil is burned with air in the presence of the coal combustion gases, to raise the temperature of the resultant combined combustion gases to at least 2300° F. (1260° C.), before their introduction into the calciner along with the solid material to be calcined.

This apparatus and the method of its operation may also include a fly ash cyclone located between the coal furnace and the throatpiece, for collecting fly ash particles that are entrained in the coal combustion gases.

BRIEF DESCRIPTION OF THE DRAWING

The drawing illustrates a flow diagram of a preferred embodiment of the invention, in which trona ore is calcined in a rotary calciner retrofitted from natural gas operation to coal-firing with supplemental heating from natural gas.

DETAILED DESCRIPTION

The present invention allows an existing rotary-type calciner or kiln, designed to operate with natural gas or fuel oil as the firing fuel, to utilize coal as a fuel source without substantial reduction of the calciner's original design material processing capacity.

The retrofit, or conversion, of a gas- or oil-fired calciner to the mode of operation contemplated in this invention is accomplished in a relatively simple but ingenious fashion. A coal combustion furnace with ancillary coal storage and conveying equipment, and a natural gas or fuel oil booster burner, located in a throatpiece connecting the furnace with the calciner, replace the existing burner arrangement.

Coal in a storage silo or hopper, or storage pile, is transported via a conveyor belt or analogous conveying device to the coal furnace, as required. The coal furnace is simply a conventional coal combustion unit, but is preferably a stoker. The coal is typically in crushed form for feed to a stoker but may optionally be pulverized, depending on the requirements of the particular type of coal combustion unit or furnace employed. Excessive fines are desirably minimized to avoid entrainment of uncombusted fines in the coal combustion gas stream.

The operation of the coal furnace is controlled such that the burning of coal with air yields combustion gases whose temperature is below the softening (or deformation) point of the coal ash. This temperature control is conventionally accomplished through adjustment of the excess or diluent air introduced to the combustion unit. The coal ash deformation temperature depends on the characteristics of the coal being burned. Western sub-bituminous-type or high volatile bituminous-type coals will typically have a softening temperature at or above 1900° F. (1040° C.). The coal and air are preferably burned in proportions and under conditions in the furnace which yield coal combustion gas having a temperature within the range 1500°–1900° F. (815°–1040° C.), but in any event less than the coal ash softening point.

Combustion gases from the coal furnace are directed through a throatpiece, or collar, connecting the furnace with the inclined rotary calciner. For the preferred co-current gas and calcine flow, the throatpiece would be located at the upper end of the inclined calciner. Countercurrent gas and calcine flows would call for the furnace-calciner throatpiece connection to be at the lower end of the calciner.

In a preferred retrofit arrangement, a coal ash collection device, such as a cyclone, is installed so as to treat the coal combustion gas stream before its contact with the booster burner. This procedure reduces the amount of fly ash that otherwise remains entrained in the combustion gas stream leaving the coal furnace. Such entrained ash is vulnerable to melting when the gas stream is heated further by the booster burner, leading to undesirable scale formation in the calciner.

The collection device need not be a separate cyclone, but may be designed to be integral with the throatpiece or, alternatively, with the coal furnace, subject only to the requirements noted above. The latter situation corresponds to a well-designed coal furnace in which the ductwork is arranged to provide for the efficient collection of fly-ash, so that the coal combustion gases leaving the furnace are relatively low in particulates.

The booster burner is preferably located in the throatpiece, so as to boost the coal combustion gas temperature prior to the gases entering the calciner for contact with the solids. Alternatively, the booster burner may be located at or near the entry point of the rotary calciner. The booster burner may utilize either natural gas or fuel oil as a fuel source, the choice logically based on the availability and economics of the fuel for the particular retrofit situation.

The booster burner or auxiliary burner is desirably constructed as an extension to the throatpiece wall or attached to the throatpiece connecting the coal furnace to the calciner. The precise dimensions and configuration of the booster burner are dictated by normal design and operating constraints, e.g., no impingement of burner flames on equipment wall surfaces or on solids to be calcined. The booster burner may have one burner, or alternatively, multiple burners.

The booster burner is desirably operated in a fashion to provide hot combustion gases at temperature and velocity conditions that are substantially the same as those the calciner was originally designed for.

The resultant combustion gases leaving the throatpiece region consist of coal combustion gas combined with combustion gas from the booster burner and are at a preselected temperature determined by the calciner or kiln characteristics sought and the material being treated. Generally, the temperature of the resultant, combined combustion gases should be similar to that achieved with the original, design fuel (gas or oil), provided flow volume rates and velocities are comparable. The primary objective is to provide required heat for calcination, at a sufficiently high temperature to yield an adequate driving force, without deviating significantly from the original calciner design conditions and thereby adversely affecting material processing capacity.

The booster burner will typically heat the coal combustion gases by an amount such that the temperature of the resultant combined combustion gases entering the calciner will range from about 2500°–3000° F. (1370°–1650° C.). Temperatures in excess of 3000° F. (1650° C.), particularly in excess of 3200°–3500° F. (1760°–1925° C.), are best avoided to minimize the possibility of damage to the calciner or kiln shell.

The relative amounts of coal and gas, or oil, should be controlled, within the operating constraints noted earlier, such that at least half of the heat value in the resultant combined hot combustion gases entering the calciner is supplied from coal combustion. In a preferred operating embodiment, the ratio of coal to gas, or oil, is maintained at a proportion which provides about two-thirds of the combustion gas heat value from coal combustion.

A preferred mode of operation utilizes a control system that links the coal stoker operation to the booster burner operation such that the proportion of coal-to-gas (or oil) being burned remains relatively constant. Another means for enhancing overall system efficiency is recycling a portion of the calciner exit gases for use as "excess" or diluent air in the operation of the coal combustion unit.

The retrofit or conversion contemplated by the present invention is applicable to rotary calciners or kilns used in a number of applications. The invention is particularly suited to rotary calciners employed for processing of trona ore in the "monohydrate" soda ash process, as described in the Example below. It is also useful in retrofitting cement rotary kilns, lime rotary kilns, as well as other solids calcination systems where high gas temperatures are required for efficient operation of the calciner or kiln.

Calciner conversions or retrofits made according to the present invention result in several worthwhile benefits. First, substantial conversion to coal as a firing fuel is possible, minimizing reliance on more costly and/or scarce natural gas or fuel oil. The conversion procedure is readily adapted to most existing gas- or oil-fired rotary calciner operations, and may be accomplished with modest capital expenditures.

The booster burner may optionally be designed with enough reserve capacity to provide the total heat requirements (at the proper temperature) on an emergency basis, during periods when the coal combustion unit is out of service. This flexibility, of course, is normally not present with a complete retrofit to coal usage.

An advantage of this invention, especially with respect to the calcination of trona ore, is that there is no appreciable increase in emissions, either particulate or sulfur dioxide, despite the substantial conversion to a relatively "dirty" fuel, coal.

Because fly ash is collected before combustion gases enter the booster burner and combustion gas flow rates through the calciner remain relatively unchanged, off-gas dust collection and handling is not increased significantly. Particulate emissions in the calciner off-gas have been found to be very dependent on, and proportional to, the volumetric gas flow rate.

In trona ore calciner conversions, sulfur dioxide emissions from the burning of sulfur-containing coal are likewise not a problem. Trona ore typically absorbs most $SO_2$ present in the combustion gas passing through the calciner. Similar results are anticipated in lime and cement calcination operations.

EXAMPLE

In this Example, trona ore (crude sodium sesquicarbonate) is calcined at elevated temperature in a rotary calciner to an anhydrous crude sodium carbonate. The rotary calciner is a gas-fired calciner that has been retrofitted for coal-firing with a natural gas-fired booster burner to achieve the desired high temperatures needed for the combustion gas introduced to the calciner.

Reference numerals referred to are those used in the drawing, which illustrates the apparatus described in this Example.

Western subbituminous coal 1, containing about 0.5–3% S, is conveyed from a coal storage silo 2 via conveyor belt 3 to a coal crusher 4. The large coal lumps are reduced in size in coal crusher 4 such that substantially all lumps are less than 1¼″ (3 cm) in size.

The crushed coal lumps are then conveyed via conveyor 5 to a feed chute 6 that introduces the coal at a controlled rate to the coal stoker 7. The coal is burned with air 8 in the stoker 7. Fly ash 9 which is a combustion byproduct is discarded as waste.

Combustion gas that results from the coal burning in the stoker 7, at a temperature of about 1800°–1900° F. (980°–1040° C.), is directed through a fly ash cyclone 10 which removes fly ash particles that are entrained in the coal combustion gas. The fly ash 11 collected in the cyclone is discarded as waste.

The treated coal combustion gas is then passed through a throatpiece or collar ring 12 that connects the cyclone 10 with the rotary calciner 13. A booster burner 14, used to raise the temperature of the coal combustion gas, is located in the throatpiece 12. Natural gas 15 is burned with air 16 in the booster burner 14 to raise the temperature of the coal combustion gas to about 2600°–3000° F. (1425°–1650° C.), after which the resultant combined hot combustion gases are passed into the rotary calciner 13.

Trona ore 17 is introduced via a chute 18 into the upper end of the inclined calciner 13, so that it may be calcined by contact with the hot combustion gases. Flights (not shown) on the inside of the rotating calciner wall serve to lift and shower the trona ore as it passes through the calciner, ensuring good contact with the co-currently flowing hot gases. Calcined trona ore exits as spill 19 from the lower end of the calciner 13, and the combustion gas exits as off-gas 20 from the end of the calciner 13. A portion 21 of the off-gas 20 is recycled to the coal stoker 7 to provide heated diluent or excess "air" required to maintain the coal combustion gas temperature at the desired 1800°–1900° F. (980°–1040° C.).

In order to calcine trona ore at a rate of 480,000 lb/hr (218,000 kg/hr), a total of $269 \times 10^6$ Btu/hr of heat is supplied from the hot combustion gas flow. This typically requires that 19,000 lb/hr (8600 kg/hr) of coal be burned in the stoker 7, to provide $184 \times 10^6$ Btu/hr, and that 4700 lb/hr (2130 kg/hr) of natural gas 15 be burned in the booster burner 11, to supply the balance of heat.

By comparison, complete reliance on natural gas for the firing heat needed to calcine trona at this rate would require 13,500 lb/hr (6120 kg/hr) of natural gas, 189% more than used above. On the other hand, if the calciner were fully converted to coal, with no supplemental gas or oil being used, the coal combustion gases at a temperature of about 1900° F. and at the same gas flow rate are estimated to be capable of calcining not more than about 60% of the 480,000 lb./hr. of trona calcined in the retrofit Example.

We claim:

1. A method for operating a rotary calciner designed to process trona ore with oil or natural gas-firing and retrofitted to include coal-firing, which comprises
    (a) burning coal with air in a coal furnace to yield combustion gases whose temperature is below the softening point of the coal ash;
    (b) directing the coal-combustion gases, from which entrained fly ash particles have been removed, into proximity to a natural gas or oil booster burner;
    (c) burning sufficient natural gas or oil in the booster burner, in the presence of the coal combustion gases but not in direct contact with the trona ore, to raise the temperature of the resultant combined combustion gases to at least 2300° F. but not more than 3000° F.;
    (d) limiting the relative amount of natural gas or oil burned with respect to the coal such that at least half of the heat value in the resultant combined combustion gases is supplied from the coal combustion; and
    (e) introducing the resultant combined combustion gases into a rotary calciner, whereby up to a design capacity rate of material is processed by contact with such hot combustion gases.

2. The method of claim 1 wherein the temperature of the coal combustion gases is about 1500°–1900° F.

3. The method of claim 1 or 2 wherein the temperature of the combustion gases is raised in the booster burner to at least 2500° F.

* * * * *